(12) United States Patent
Teague

(10) Patent No.: US 7,702,678 B2
(45) Date of Patent: Apr. 20, 2010

(54) SEARCH CAPTURE

(75) Inventor: Charles J. Teague, Belmont, MA (US)

(73) Assignee: Microsoft Corporation, Redmond, WA (US)

( * ) Notice: Subject to any disclaimer, the term of this patent is extended or adjusted under 35 U.S.C. 154(b) by 324 days.

(21) Appl. No.: 11/079,446

(22) Filed: Mar. 14, 2005

(65) Prior Publication Data

US 2005/0216452 A1    Sep. 29, 2005

Related U.S. Application Data

(60) Provisional application No. 60/552,503, filed on Mar. 12, 2004.

(51) Int. Cl.
    *G06F 7/00*    (2006.01)
(52) U.S. Cl. ........................................ 707/722
(58) Field of Classification Search .............. 707/3
    See application file for complete search history.

(56) References Cited

U.S. PATENT DOCUMENTS

| | | | |
|---|---|---|---|
| 5,220,657 | A | 6/1993 | Bly et al. |
| 6,009,442 | A | 12/1999 | Chen et al. |
| 6,199,106 | B1 | 3/2001 | Shaw et al. |
| 6,564,215 | B1 | 5/2003 | Hsiao et al. |
| 6,658,402 | B1 * | 12/2003 | Dutta ............................ 707/2 |
| 6,947,770 | B2 | 9/2005 | Rydbeck |
| 7,194,743 | B2 | 3/2007 | Hayton et al. |
| 2002/0040311 | A1 | 4/2002 | Douglass et al. |
| 2002/0040384 | A1 | 4/2002 | Moetteli |
| 2002/0049809 | A1 | 4/2002 | Moetteli |
| 2002/0078102 | A1 | 6/2002 | Dutta |
| 2002/0091836 | A1 | 7/2002 | Moetteli |
| 2002/0124055 | A1 | 9/2002 | Reisman |
| 2003/0160815 | A1 | 8/2003 | Muschetto |
| 2004/0019611 | A1 | 1/2004 | Pearse et al. |
| 2004/0186861 | A1 | 9/2004 | Phatak |
| 2004/0187074 | A1 | 9/2004 | Keohane et al. |
| 2005/0015464 | A1 | 1/2005 | Young |
| 2005/0080804 | A1 * | 4/2005 | Bradshaw et al. ........... 707/102 |
| 2005/0091186 | A1 | 4/2005 | Elish |

(Continued)

OTHER PUBLICATIONS

Fielding, Roy T.; "Maintaining Distributed Hypertext Infostructures: Welcome to MOMspider's Web"; Proceedings of the First International Conference on the World-Wide Web (WWW94), Geneva, May 25-27, 1994.

(Continued)

*Primary Examiner*—Charles Rones
*Assistant Examiner*—Fazlul Quader
(74) *Attorney, Agent, or Firm*—Shook, Hardy & Bacon L.L.P.

(57) ABSTRACT

When a Web-browser user employs a hyperlink, a Web-information manager makes a log entry that includes the URL of the Web page containing the hyperlink and also lists the URL of the target Web page, to which the hyperlink refers. When the user requests that a Web page be captured for later use, the Web-information manager uses the log to find the page at the root of the hyperlink chain that led to that page. It then determines from the root page's URL whether the root page is a search-result page. If it is, the Web-information manager infers the search specification from that URL and associates it with the page to be captured.

15 Claims, 16 Drawing Sheets

U.S. PATENT DOCUMENTS

2005/0114756 A1* 5/2005 Lehikoinen et al. ...... 715/501.1
2005/0216290 A1* 9/2005 Sachs et al. ...................... 705/1

OTHER PUBLICATIONS

Fielding, Roy T.; "MOMspider, Multi-owner Maintenance Spider"; http://ftp.ICS.UCI.edu/pub/websoft/MOMspider, Department of Information and Computer Science, University of California, Irvine, CA, May 13, 1998.

Patel. It was OnFolio and now it is ContentSaver (Foru), Mar. 17, 2004, IT-Digest, pp. 1-4. http://geekswithblogs.net/tpatel/archive/2004/03/17/3020.aspx. Last accessed Sep. 18, 2008, 2 pages.

ContentSaver (Software for Web Research and Information Collection) http://www.macropool.com/en/download/contentsaver/index.html. Last accessed Sep. 18, 2008.

OA Dated Jul. 14, 2008 for U.S. Appl. No. 11/079,455, 18 pages.

OA Dated Sep. 23, 2008 for U.S. Appl. No. 11/079,449, 24 pages.

Mattison. Bibliographic Research Tools Round-up, Searcher, Medford, Oct. 2005, vol. 13, issue 9, p. 16, downloaded from ProQuestDirect on the Internet on Feb. 10, 2009, 15 pages.

Wagner. Allaire Founders Tackle Web Collaboration, Developer, May 15, 2004, downloaded from ProQuestDirect on the Internet on Feb. 10, 2009, 5 pages.

Wayback Machine, www.archive.org, Onfolio Web Site, downloaded from the internet on Feb. 20, 2009, 5 pages.

OA Dated Mar. 2, 2009 for U.S. Appl. No. 11/079,454, 18 pages.

OA Dated Jan. 23, 2009 for U.S. Appl. No. 11/079,455, 24 pages.

OA Dated Nov. 3, 2008 for U.S. Appl. No. 11/079,901, 16 pages.

Hoffman, Designing Better HTML Authoring Tool, Jun. 3, 2002. http://web.archive.org/web20020603123036/www.hypertextnavigation.com/authtols.htm.

* cited by examiner

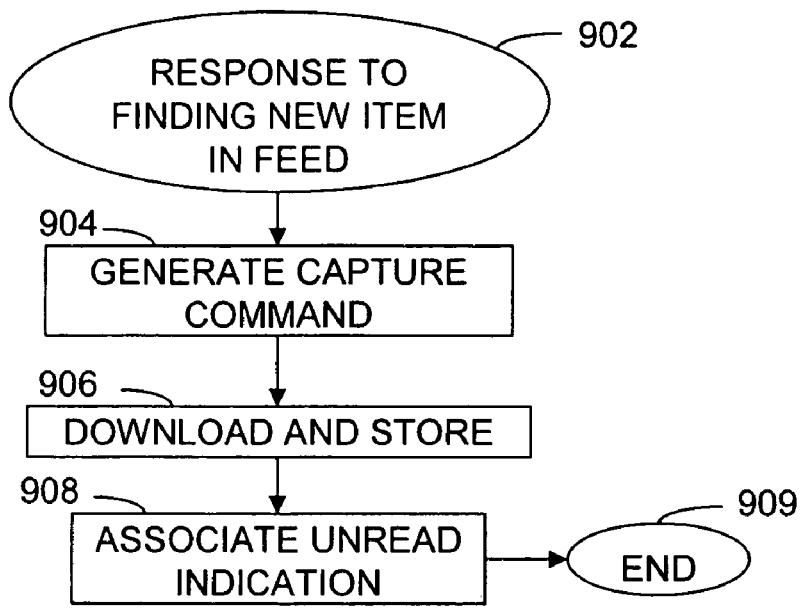
FIG. 14A
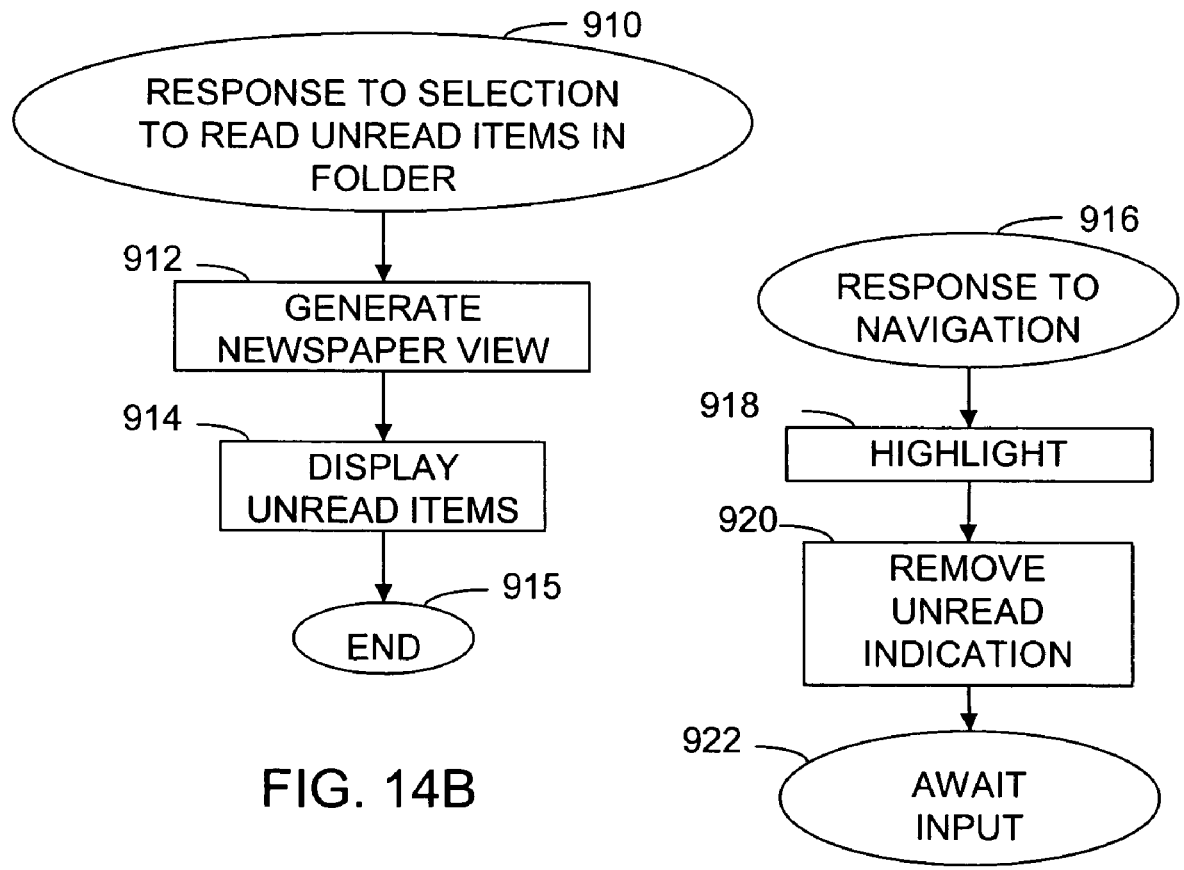
FIG. 14B
FIG. 14C

SEARCH CAPTURE

CROSS-REFERENCE TO RELATED APPLICATIONS

This application claims the benefit, and incorporates by reference the entire disclosure, of U.S. Provisional Patent Application No. 60/552,503, which was filed on Mar. 12, 2004, by Charles J. Teague et al. for Onfolio. Additionally, this application is related to U.S. patent applications Ser. No. 11/079,449 of Charles J. Teague for Local Storage of Script-Containing Content, Ser. No. 11/079,447 of Joseph Mau-Ning Cheng for Sharing Collection-File Contents, Ser. No. 11/079,455 of Donald A. Washburn for Unread-State Management, Ser. No. 11/079,454 of Brian M. Lambert for Retaining Custom Item Order, and Ser. No. 11/079,901 of Donald A. Washburn for Editing Multi-Layer Documents, all of which were filed on the same day as this application.

BACKGROUND OF THE INVENTION

1. Field of the Invention
The invention concerns keeping track of online research.
2. Background Information
Online research has become a powerful tool for obtaining information on virtually any topic. Search engines provide an easy way to find information on Web pages. While finding the information may be relatively straightforward, capturing, saving, and organizing the information for later reference can be tedious. As a consequence, software tools have been developed that configure a computer to act as a Web-information manager, i.e., as a tool that performs in an automated fashion many of the tasks that people doing Web research had previously performed more manually.

SUMMARY OF THE INVENTION

I have developed a feature that enhances the usefulness of Web-information managers and similar tools. In accordance with this feature, the tool identifies the search specification at the root of the hyperlink chain that led to a Web page of interest. It does so by inspecting the URL of the page at the root of the chain and inferring from that page whether the page is a search-result page and, if so, what the search specification was.

BRIEF DESCRIPTION OF THE DRAWINGS

The following figures depict certain illustrative embodiments in which like reference numerals refer to like elements. These depicted embodiments are to be understood as illustrative and not as limiting in any way.

FIGS. 14A-C are flow charts that illustrate a method for managing a feed service and displaying and tracking unread items captured from the feed service.

DETAILED DESCRIPTION OF AN ILLUSTRATIVE EMBODIMENT

To provide an overall understanding, certain illustrative embodiments of the invention will now be described; however, it will be understood by one of ordinary skill in the art that the embodiments described herein can be adapted and modified without departing from the scope of the invention.

Overview

The invention here described finds particular applicability in a Web-information manager. It will therefore be described by reference to an embodiment that performs that function. That embodiment is intended for so integrating with a browser as to enable a user to collect, store, organize, and share Web pages, pictures, text, and other material, content, and/or information from the Web or other online sources. That embodiment will be referred to herein as the Onfolio™ Web-information manager, but the invention can be employed in applications other than the Onfolio™ Web-information manager.

Figure 1:
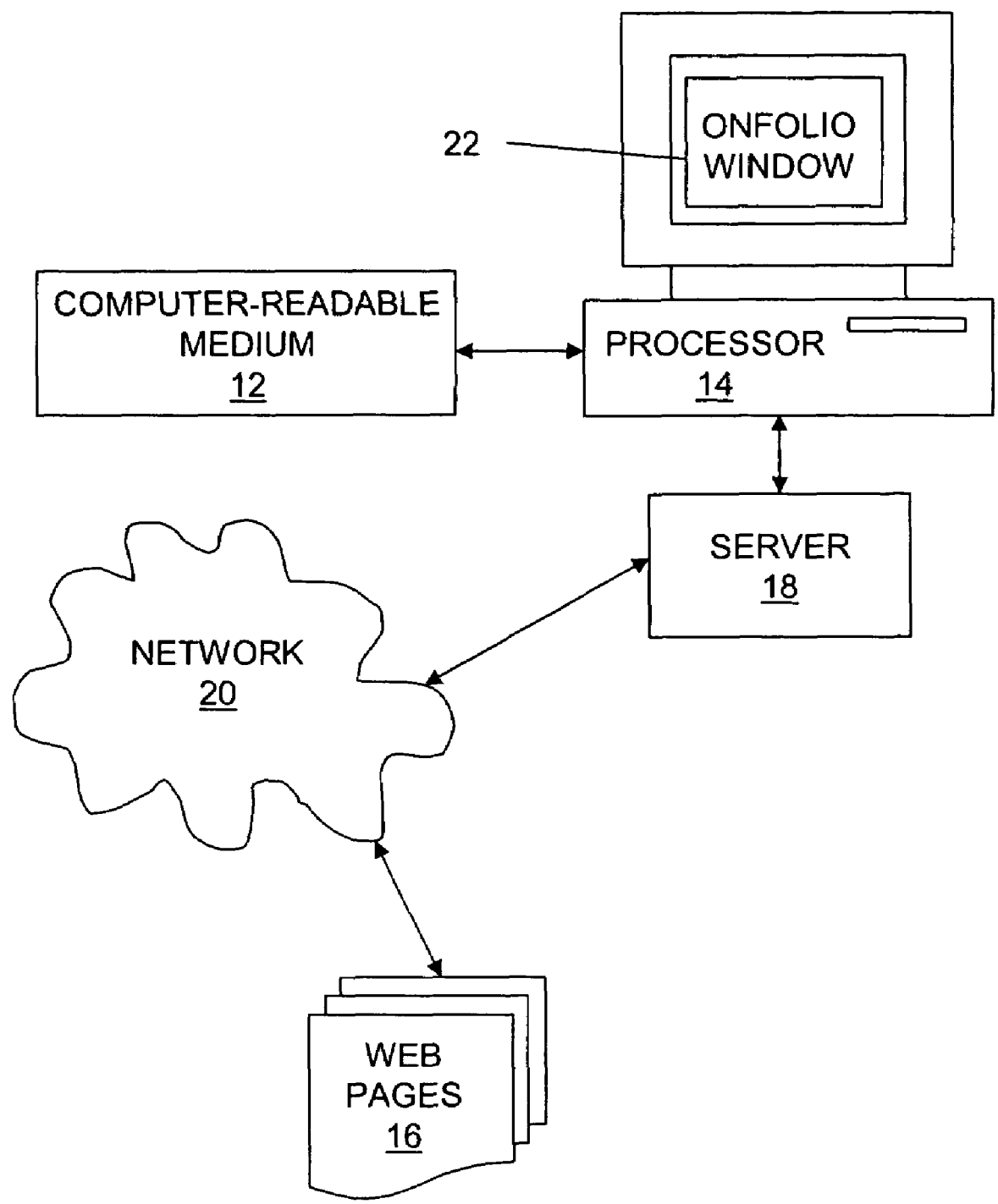
FIG. 1 is a schematic representation of components of a system for use of the Onfolio application.

FIG. 1 depicts a computer-readable medium 12 containing instructions that configure a processor or computer 14 as a platform or interface that implements the invention. The interface may be integrated with an internet browser running on computer 14, which obtains Web pages 16 through a server 18 connected to a network 20, such as the Internet, an intranet, a Wide Area Network (WAN), a Local Area Network (LAN), or some other network.

The interface window 22 may be distinct from the Internet browser; i.e., closing either the interface window or an associated internet browser window may not necessarily cause the other window to close. Further, the illustrated embodiment allows for associating multiple internet browsers with a given interface window while, at the same time, multiple interface windows may be synchronized such that an update and/or change to content in one interface window may cause an update/change to other interface windows. Further, although multiple Internet-browser windows may be present, a user may configure the system so that only selected ones of the Internet browsers are associated with a given Interface window.

Capture

Figure 2:
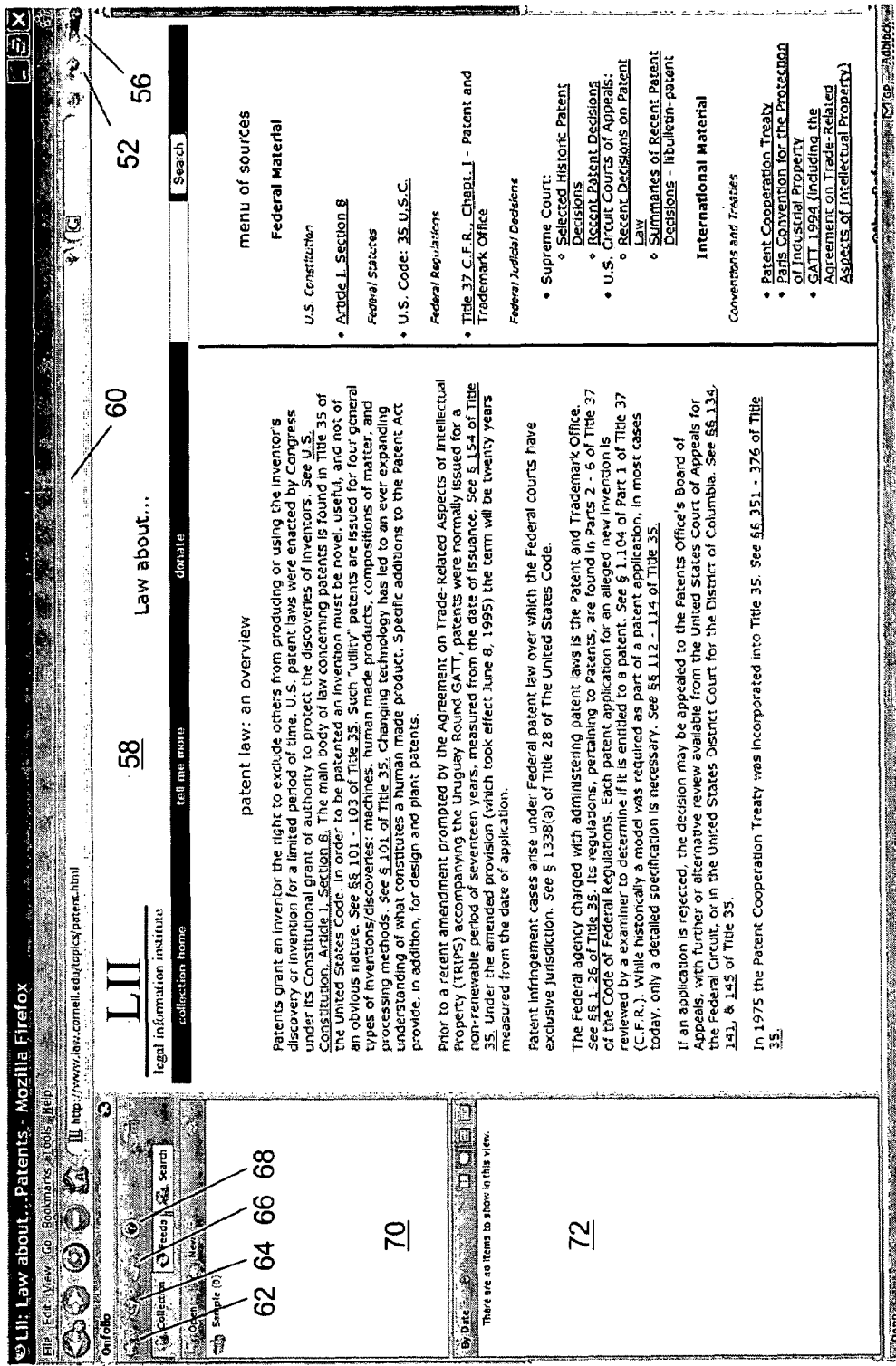
FIG. 2 is an illustrative screen shot showing an Onfolio interface.

The illustrated embodiment enables a user to retrieve, capture, and/or otherwise store collections of information ("Onfolio™ collections"), and the retrieved and/or captured information is associated with and/or appears in a browser window associated with an Interface window. FIG. 2 is an illustrative screen shot of the interface 50. The toolbar includes a button 52 for opening and closing a collection-explorer pane 54. It also includes a button 56 for capturing selected content shown in browser window 58. The URL for the web page in window 58 is shown in address bar 60. Collection-explorer pane 54 includes menu icons for File 62, Edit 64, Publish 66, and Help 68. Clicking on an icon opens the related menu. Pane 54 also includes folder pane 70 and item-list pane 72. The locations of window 58 and panes 54, 70, and 72 are selectable by the user, and various configurations can be contemplated, including a side-by-side configuration and a tiled configuration.

Figure 3:
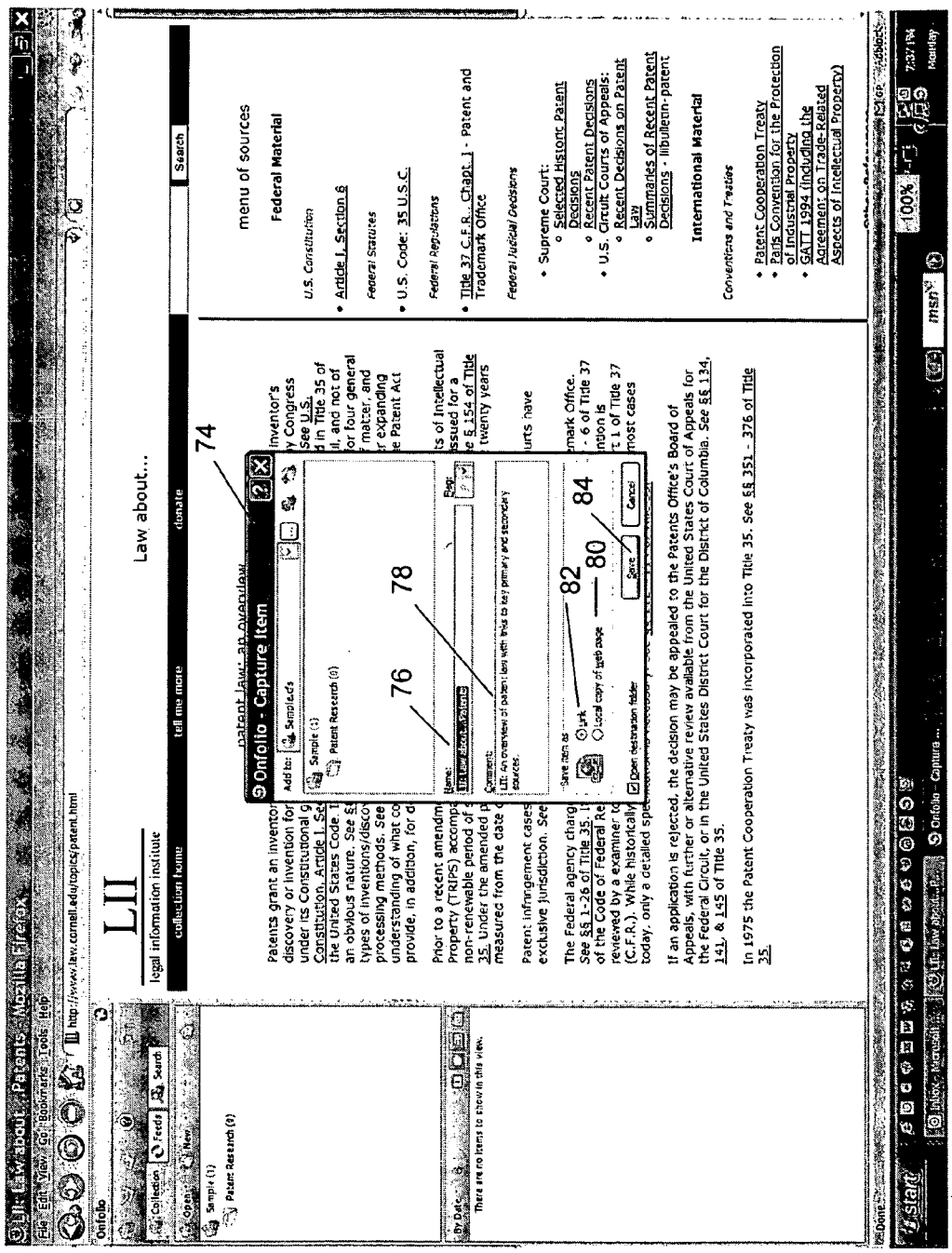
FIG. 3 is an illustrative screen shot showing a capture dialog box.

The user may select data to capture from browser window 58 (e.g., by right clicking on the window and selecting the option to "capture to Onfolio" or by selecting the window or objects in the window and clicking the capture button 56). FIG. 3 is an illustrative screen shot showing the appearance that the interface 50 assumes when the user selects data to be captured. The user can operate the illustrated embodiment to capture the selected content (a web page and/or portion of a web page), metadata associated with the web page (e.g., keywords, author, copyright information, comments, etc.), the URL associated with the web page, and, when the web page is associated with a search engine, the search engine's identity and the search terms that were used to obtain the search results.

In response to the user's request to capture content, the illustrated embodiment opens a dialog box 74 that provides several fields for user input. The name field 76 and the comment field 78 enable the user to enter the name and comment that will appear for this item in item list pane 72. Selection buttons enable the user to choose whether the system will download and save a local copy (80) of the selected content or will provide a link (82) to the selected content. Clicking the save button 84 causes the selected action to be performed. The dialog box also enables the user to designate a location (e.g., a folder) where an identifier of the captured content can be maintained. The contents of the folder, i.e., the identifiers for captured content, can be visually presented to the user for later selection. Later selection of the identifier causes the captured content or Web page to be represented to the user.

In some embodiments, users can edit and/or provide comments to aid in identifying the captured item. Also, some embodiments may provide a flag setting and/or other indicator to be associated with the identifier and/or comments. Selecting the identifier can result in the launching of an application such as word processor or document reader (e.g., Adobe, Word, etc.) associated with the selected content. At the user's option, selection of the identifier can cause either a locally stored version to be fetched or the remote version to be down-loaded. As will be explained in more detail later, the saved contents can be associated with a search, and selection of the identifier can result in a re-execution of the search associated with the content.

Figure 4:
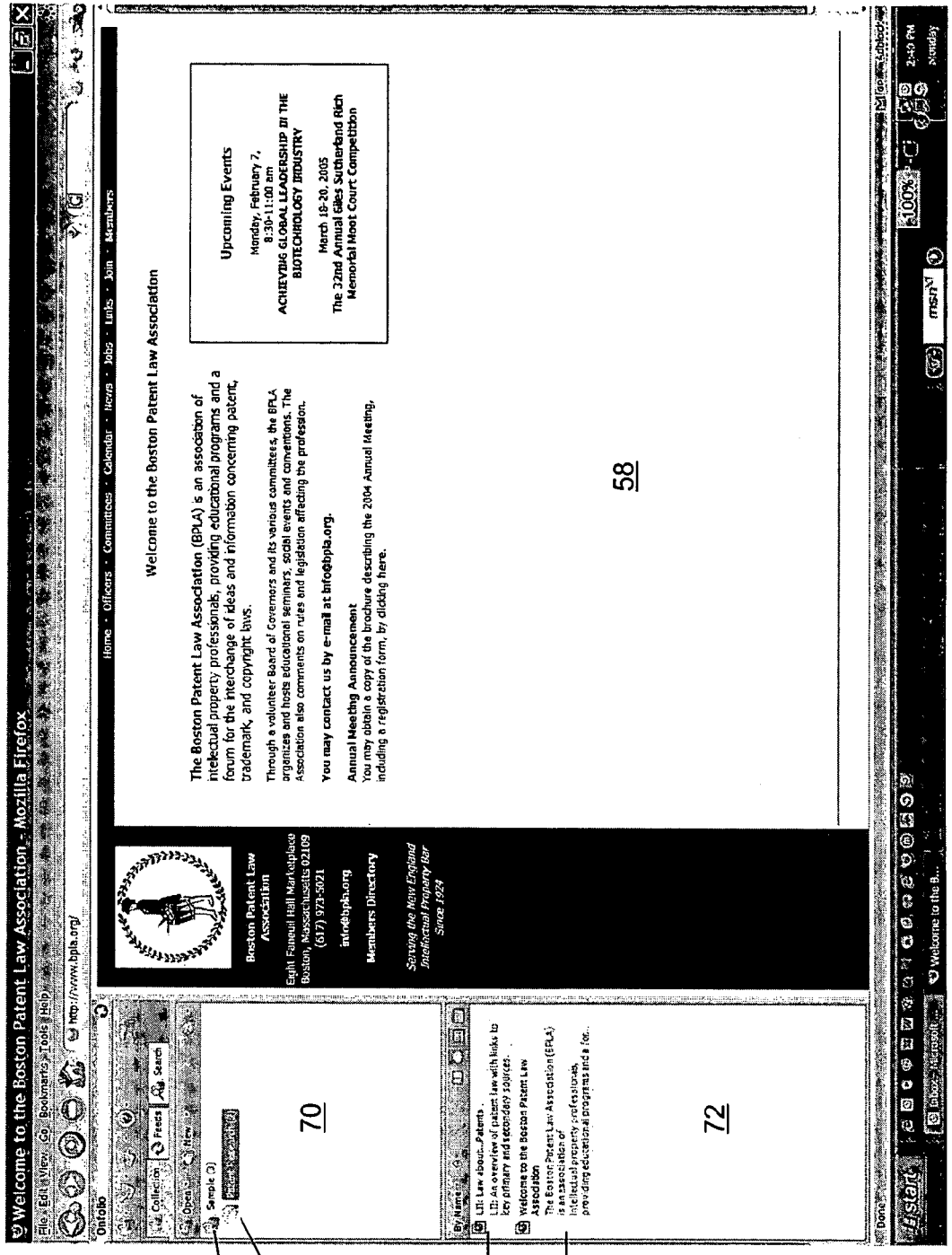
FIG. 4 is an illustrative screen shot depicting captured content.

FIG. 4 is a screen shot that depicts a situation in which the user has captured and downloaded local copies of two web pages, shown as items 86 and 88 in item list pane 72. The user has saved the web pages in sub-folder 90, under the main Sample folder 92, as shown in folder pane 70. When the user selects a folder in folder pane 70, e.g., sub-folder 90, the contents of the folder, or items in the folder, such as items 86, 88, are shown in the item list pane 72. Selecting an item displays the content corresponding to the saved link or the corresponding locally stored content, as shown in window 58.

Search-Term Capture

A typical browser-user behavior is to navigate through a chain of pages of which each page after some root page is linked to the previous page in the chain by a hyperlink in the previous page. Very frequently, the root page is one produced by a search engine such as Google in response to a search specification submitted by the user. But the chain can be long, and it is easy for a user to forget the search specification that resulted ultimately in reaching a given page.

So I have provided a capability that helps the user identify the search specification through which he reached a given page. Embodiments that provide this capability may employ different approaches to doing so. For example, some may, in response to a user's designating a search-result page as defining a search specification to be remembered, retain that page's URL (or the search specification inferred from it) so long as the hyperlink chain continues or some limit chain length is reached. If such a search result remains—i.e., if the hyperlink chain from the designated page has not been broken—then the search specification if any for the currently displayed page is the one thus retained. The Web-information manager can be configured to respond to a user request to display the specification thus associated with the currently displayed page. And, if the user commands that the current page be captured, the associated search specification can be stored with it—possibly in response to an explicit user request but preferably automatically—as an attribute that can be retrieved and reviewed. Additionally, the search thereby specified can be re-run.

Some other embodiments may take a similar approach but, instead of requiring the user to specify the root page before search-specification retention begins, monitor all visited pages' URLs for search strings and begin search-specification retention in response to detection a search string. This avoids imposing upon the user the need for foresight in identifying search specifications that he may thereafter want to remember. But it also imposes the burden of inspecting each URL. So some embodiments may instead simply retain the current hyperlink-chain root's URL, independently of whether that URL includes a search string indicative of search-engine results, and wait until a search specification is needed before determining whether the current chain began with a search, whose specification can therefore be associated with the current page.

Figure 5:
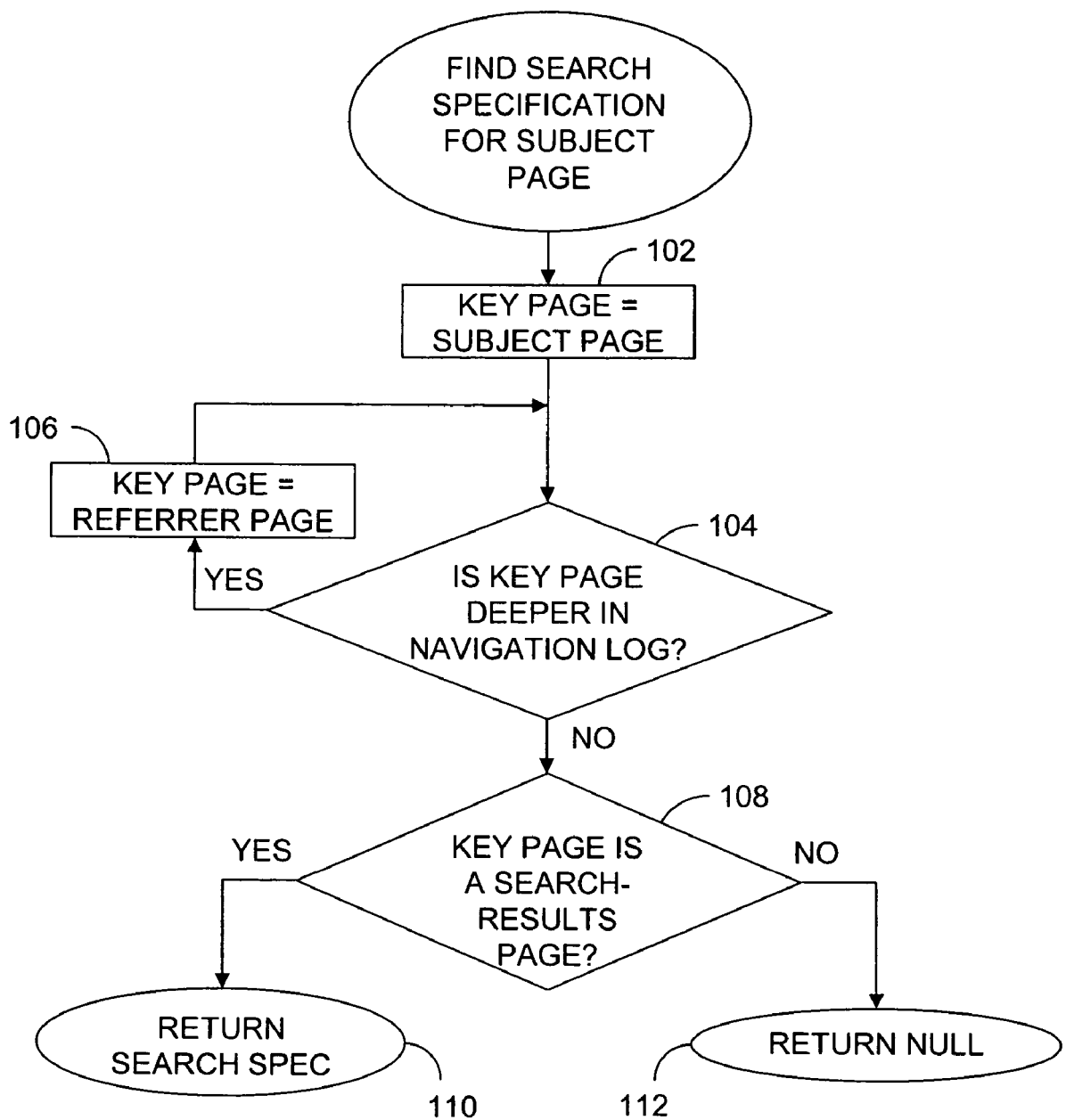
FIG. 5 is a flow chart of a routine for determining the search specification that ultimately resulted in reaching a selected Web page.

The illustrated embodiment employs an approach that is similar in principle to those just described but tends to be more robust in practice. Each time the user navigates to a new page through a hyperlink contained in a previous page, it stores in a navigation log an entry that identifies the hyperlink-including ("referrer") page as well as the new (referred-to") page, to which the hyperlink referred. In the illustrated embodiment, the identifiers are those pages' URLs. Then, when the search specification associated with a given page is needed, it finds the root of given page chain by performing an operation that FIG. 5 depicts in a simplified manner.

As that drawing's block 102 indicates, illustrated embodiment searches the log in reverse chronological order for an entry whose referred-to field contains an identifier of the page of interest. If it finds such an entry, it adopts the contents of that entry's referrer field as the next page for which to search, as blocks 104 and 106 indicate. In performing that search, it begins with the entry before the one that it just found, and it again searches in reverse chronological order.

If the search is not successful, then the page for which it is searching is taken as the root of the search chain that terminated in the page of interest. Now, because of size limitations that some embodiments may impose on the log data structure, there can be occasions in which that page is not the root. The log may, for example, be implemented as a circular list, in which the most-recent entries replace the earliest ones when the list reaches its capacity, and the root of the search chain may therefore have been deleted. Usually, though, the page not found as a referred-to page in the log is indeed the root page, and, as block 108 indicates, the illustrated routine determines whether that page is a search-result page.

It does this by inspecting the URL stored for that page. If the URL is, for instance, http://www.google.com/search?hl=en&q=onfolio, then the Web-information manager can conclude that the search was performed by the Google search engine and that the search parameter was "onfolio." As block 110 indicates, the routine's result in that case would be a search-specification object containing, for example, the search-result page's URL, the search parameters inferred from that URL, and the search engine's identity. In the typical case in which the search-specification determination is triggered in response to a command to capture a page, that search specification is stored as an attribute of the captured page. In some cases, though, the root page is not a search-result page. As block 112 indicates, a null output would accordingly result, and a user requesting the search specification associated with the captured page would be told that there is none.

Capturing Script-Containing Pages

Because execution of a server-side Web-page script (written in Javascript, for example) can modify a web page when the web page is loaded in a browser, it can be difficult to save an accurate copy of a web page. For example, the script can insert a link into a page when the page is loaded into a browser. If the resultant page is saved, the saved page will contain not only the script that inserts the link, but also the newly inserted link. If the page thus stored is displayed again, then the link will appear twice. Server-side scripts can also complicate things by modifying the current document to include references to images or other resources that were not originally referred to in the document but that must be downloaded if local copies are to be stored of all resources needed for the ultimate display.

Figure 6:
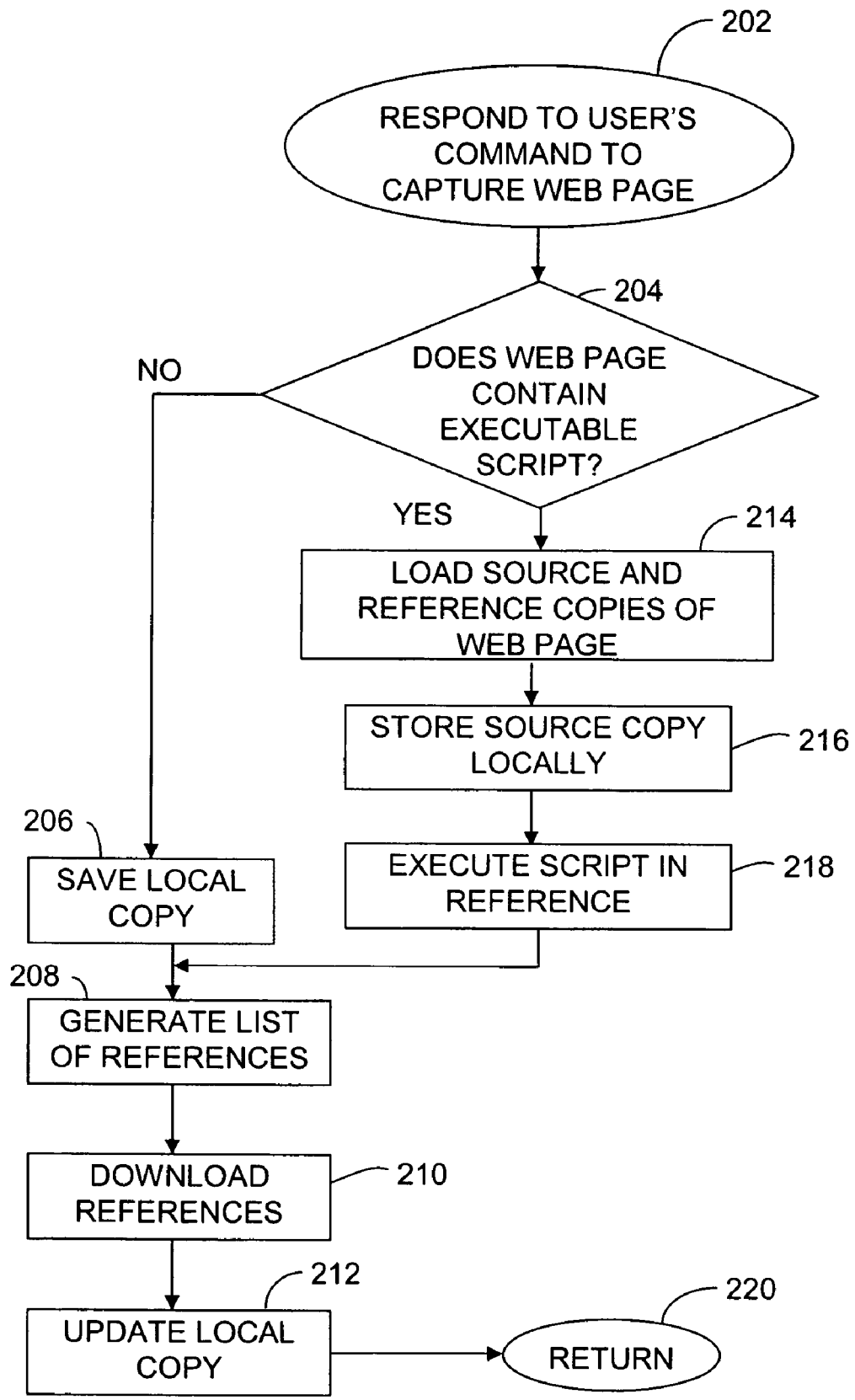
FIG. 6 is a flow chart of a method of capturing web pages containing executable script.

FIG. 6 is a flow chart of a method for dealing with this complication. The method begins 202 in response to a user's command to capture a web page. If the web page does not contain executable script, as determined at 204, a local copy of the web page is saved 206. A list of the references contained in the web page is generated 208 and the references are downloaded locally 210. The locally saved copy of the web page is then updated 212 to point to the locations of the locally downloaded references.

If the web page does contain executable script, a source copy and a reference copy of the web page are loaded 214 in a non-visible browser window. The source copy is stored 216 locally. The script is executed 218 in the reference copy but not in the source copy. A list of the references contained in the potentially script-modified reference copy is generated 208, the resource to which they refer are downloaded 210, and the locally stored copy is updated 212. In this instance, the locally stored copy is the source copy, and the update includes modifying the source copy's references to point to the locally stored versions of the referred-to resources. The method then returns 220 to await the next page capture command. When the user subsequently requests the stored web pages, the script will result in the intended display, and all resources will be locally available.

Content Capture

Figure 7:
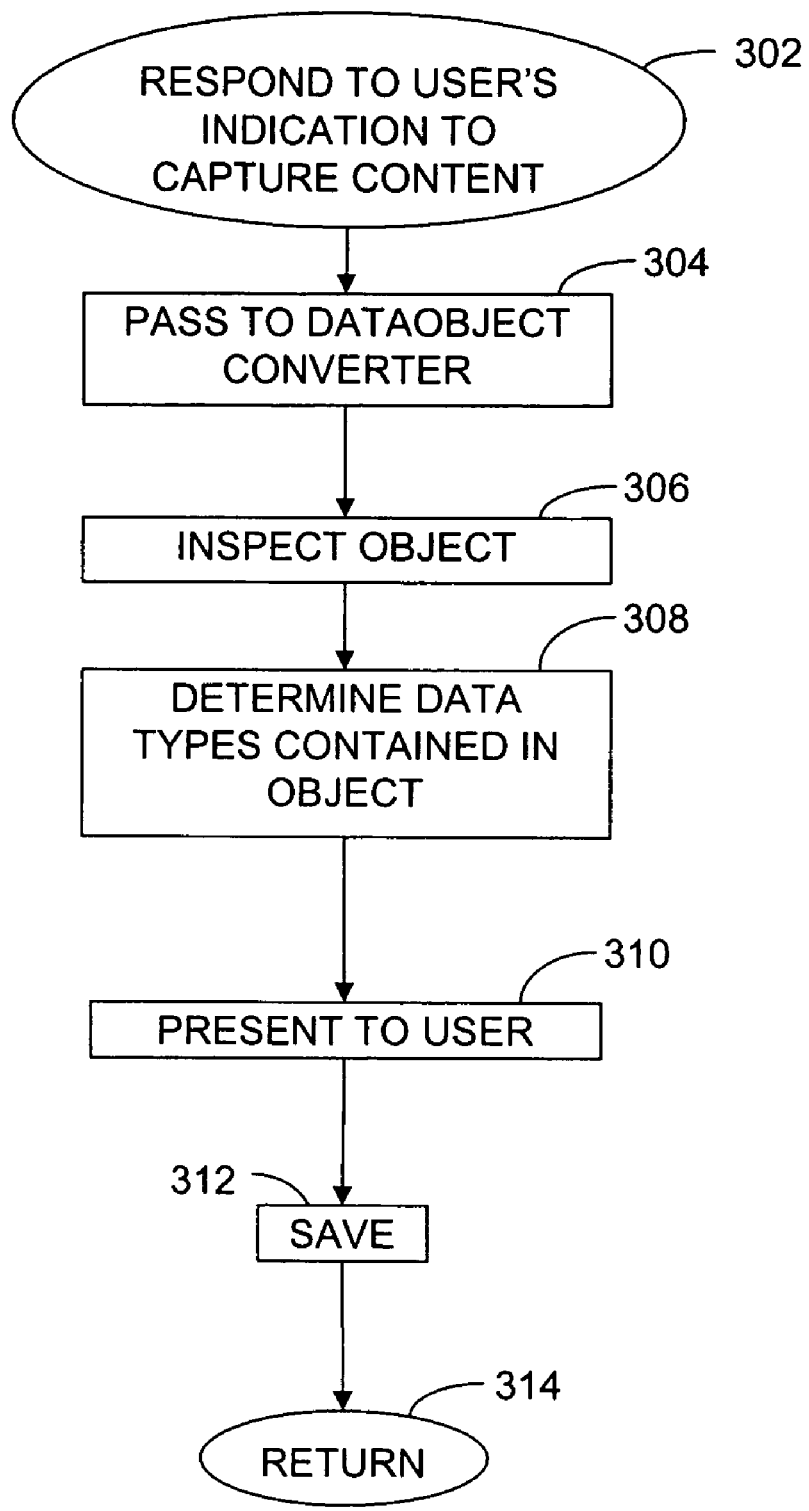
FIG. 7 is a flow chart of a method of determining a format for contents selected to be captured.

The user is not restricted to importing only whole web pages. The illustrated embodiment enables the user to select isolated elements for importation, including portions of text, a file, a link to a file, an image, a copy of the web page, a link to the web page, an object, a resource, etc. FIG. 7 is a flow chart of a method for importing various elements of a web page.

In response to a user's selecting an object in a web page 302, the selected object is passed 304 to a DataObject Converter. The DataObject Converter inspects the object 306 and determines 308 the types of information or data the object contains. For example, by parsing the HTML for the object, the DataObject Converter determines whether the HTML includes data for images, hyperlinks to other web pages, hyperlinks to files, text selection, or other types of data.

Figure 8:
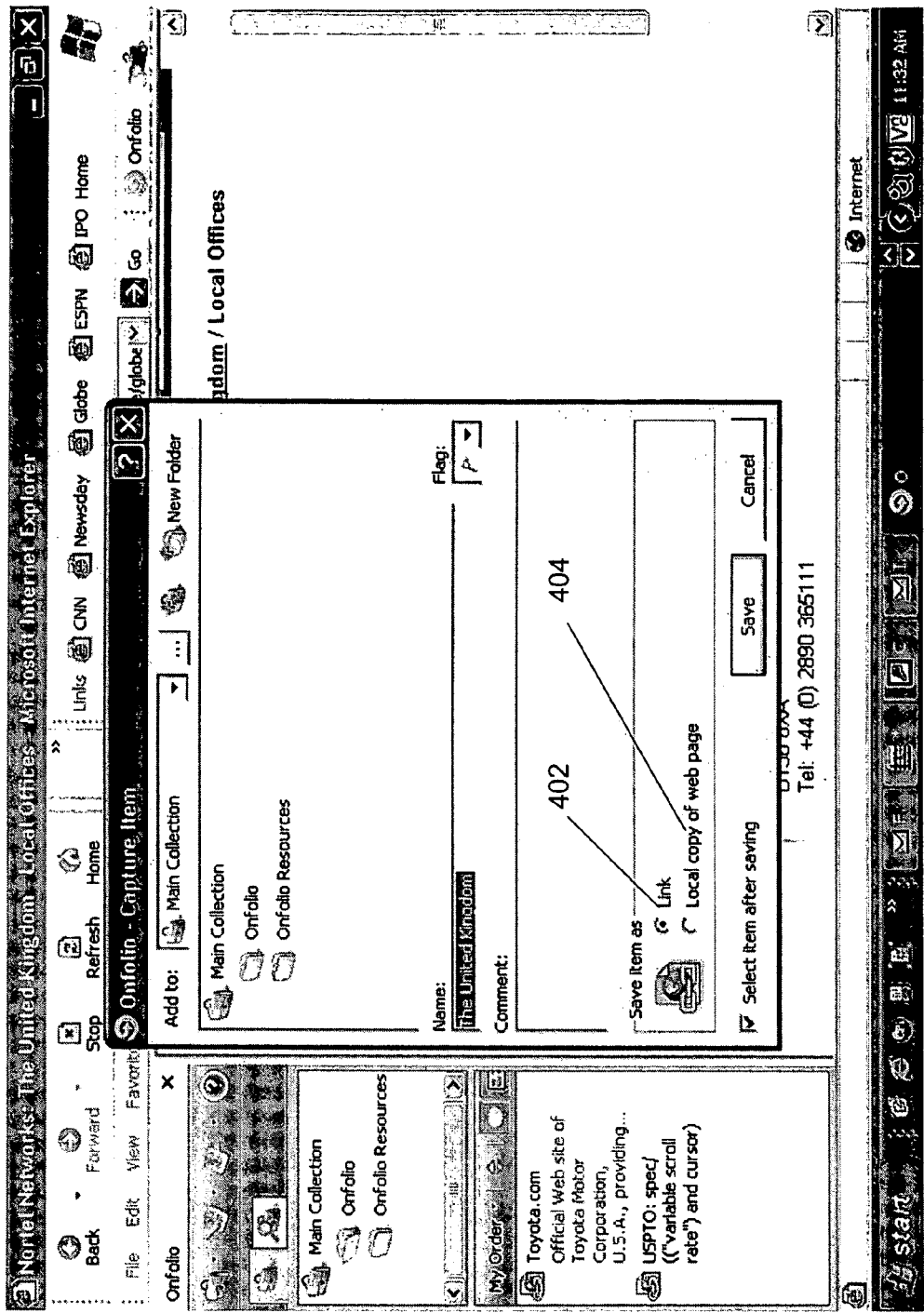
FIG. 8 is a screen shot illustrating an interface for selecting a format for the contents of FIG. 4.

For each data type found, the DataObject Converter presents 310 the user with the corresponding portion of the object and a set of actions appropriate to the data type. For example, FIG. 8 is a screen shot 400 that depicts a situation in which the selected item is a hyperlink. The user may be asked whether the selected information should be saved as a hyperlink 402 or whether a local copy of such web page should be stored 404. As FIG. 7's block 312 indicates, the content is saved in accordance with the user's selection, and the method returns 314.

Multi-layer Documents

The illustrated embodiment can also be used to create and modify multi-layer documents. When a document is to contain an abundance of information, it can be useful for the document to enable readers to get a high-level feel for the contents of the document and then allow them to "drill-down" into more-detailed information as necessary. Websites provide a drill-down environment where users can browse through information and drill-down into details by clicking a hyperlink. Over the past few years, the widespread use of the Internet has created an environment where drill-down capability has become a well-understood model for navigating through lots of information.

It has also become commonplace to store in a single, "multi-layer" file all or part of the content of the many files that usually make up a Web site and to present the content in a fashion that matches that of the Web site. For example, clicking on a link in is one page may make another page appear, but the file from which the other page is drawn is the same as that from which the first page's contents were drawn. Also, the multi-layer files will often contain image data that were stored in separate files in the original Web site.

As provided herein, a document layer can be understood to be a sub-page that is embedded within a document and is displayed as a hyperlink until a user decides to "drill down" into the document (e.g., selects the hyperlink). Each layer of a document looks like a page (or set of sequentially arranged pages) in the document, and each layer can have resources (e.g., images) embedded directly into it and can have hyperlinks to other layers within the document.

Figure 10:
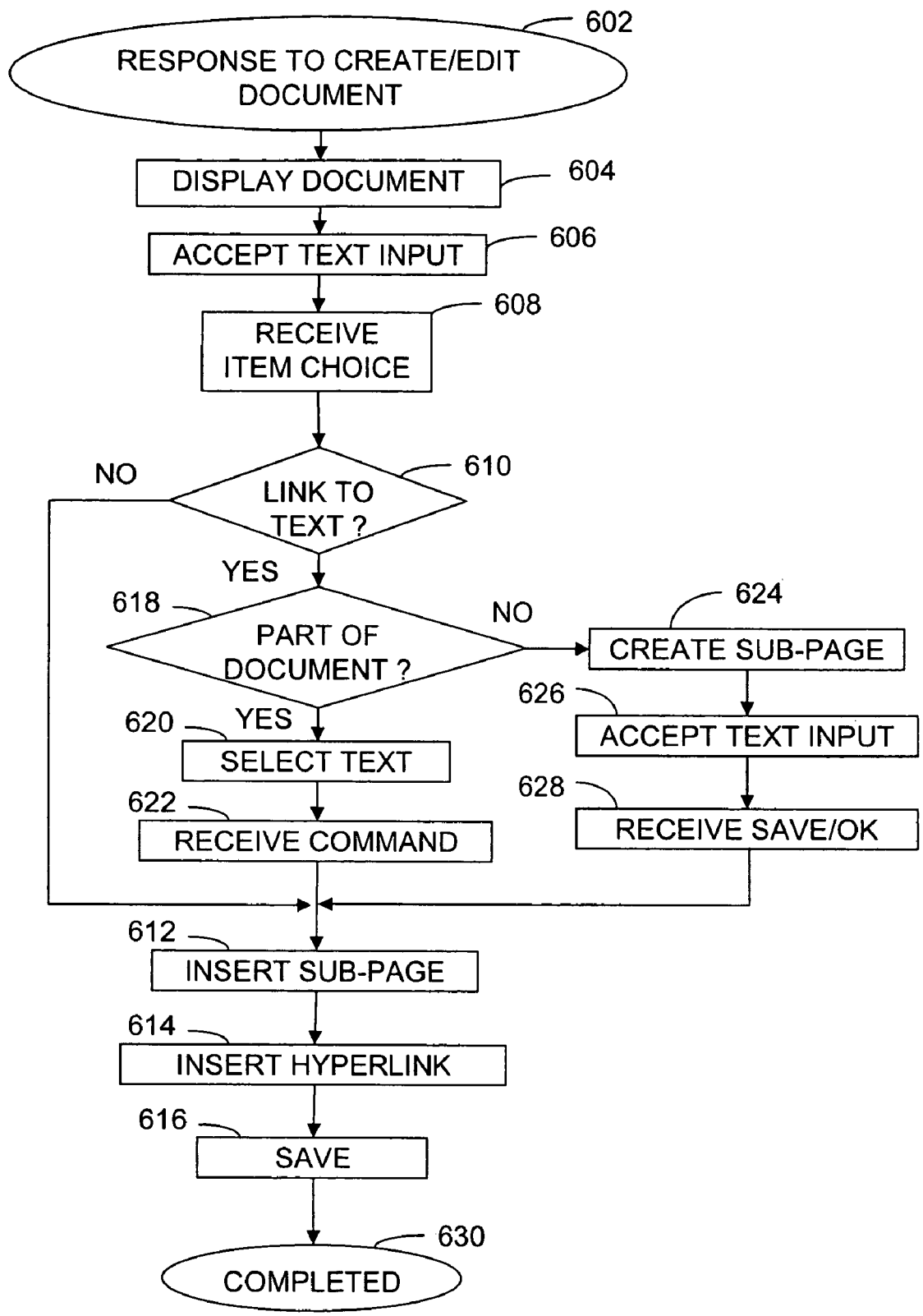
FIG. 10 is a flow chart of a method of creating and/or editing a multi-layer document.

FIG. 10 is a flow chart of a method for creating/editing a multi-layer document. The method begins 602 in response to a user's choosing to create a new document or to edit an existing document, e.g., by choosing from the menu displayed when File icon 62 (FIG. 2) is clicked on, and/or by performing other actions similar to those for other known text/document editors. When the user chooses to create a new document, a new blank document having a generic title such as "Title" is displayed 604 in, e.g., window 58 of FIG. 2. If the document is being newly created, it is a single-layer document until resources and/or pages are embedded. When the user chooses to edit an existing document, the existing document is displayed. As with known text and document editors, text can be input to the document 606, such as by typing and/or cutting and pasting text from other sources. Also, the title can be supplied or edited.

Figure 11:
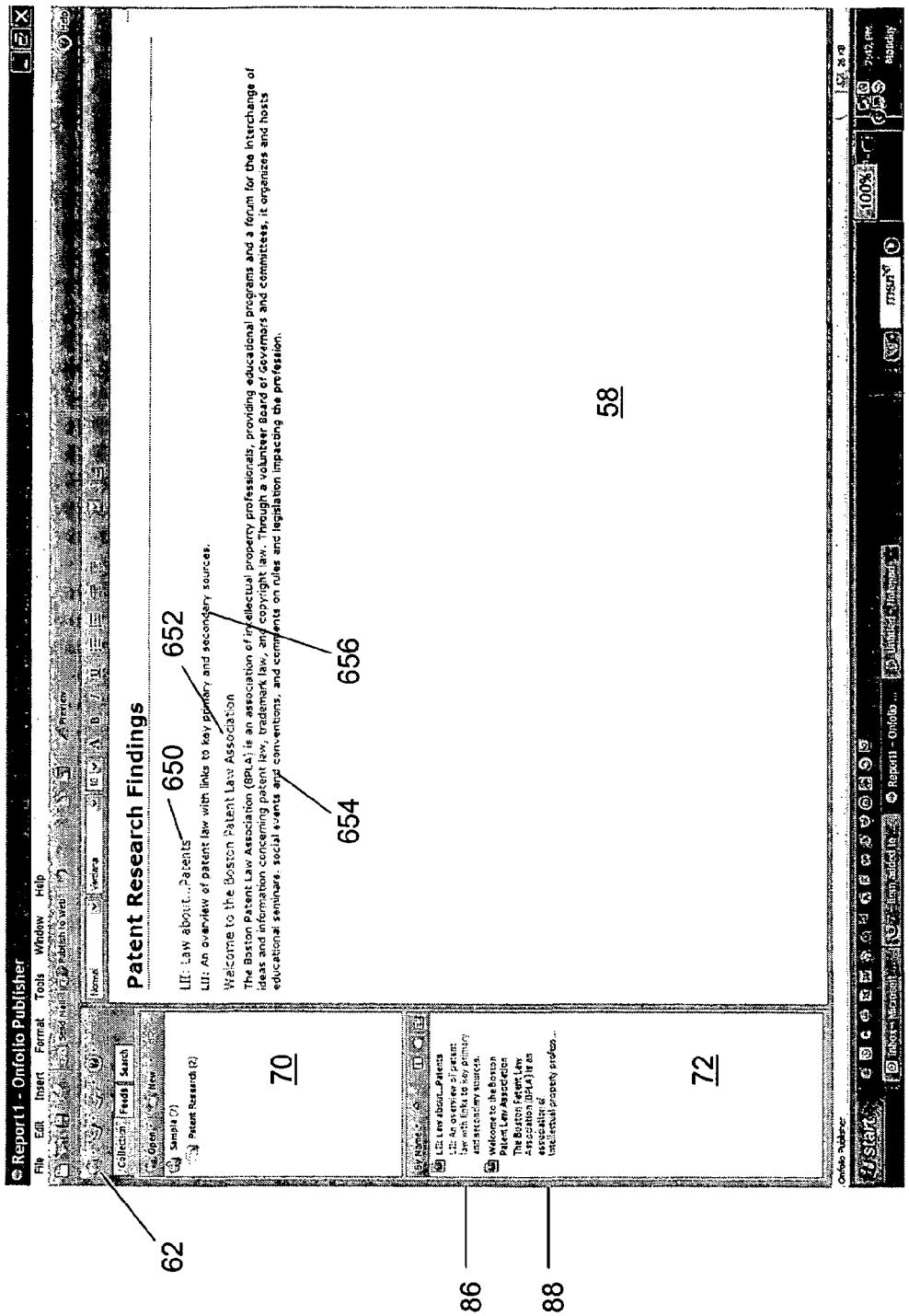
FIG. 11 is a screen shot of a new document.

Depth (i.e., layers or sub-pages) can be added to a multi-level document by the user's use of drag-and-drop and/or copy-and-paste operations on items, including selected sections of text or saved Onfolio HTML objects. For example, the user can drag and drop an item from item list pane 72 of FIG. 4 to a location on the displayed page. In response to the drag-and-drop operation, as indicated at block 608, the method first determines 610 whether the selected item is a section of text. For the HTML objects, the response to such action causes the HTML page and all of its sub-resources to be imported 612 into the multi-layer document and inserts 614 a link to the newly embedded page into the top-level page. In response to a "Save" action, e.g., by choosing from the menu displayed when File icon 62 is clicked on, the method saves the document 616 at a user-selected location, using the title as the file name. The document typically is saved in Mail HTML (MHT) format, though other formats can be used. FIG. 11 illustrates a screen shot of a new document in window 58 titled "Patent Research Findings." The document includes two links 650, 652 that result from dragging and dropping items 86 and 88 from item list pane 72 and further includes text 654, 656. The dragging and dropping causes the resources referred to by those links to be added to the MHT document. If such a link is clicked on, the associated HTML page is drawn from the MHT document and displayed.

In some instances, the user choice made by the user in FIG. 10's operation 608 is that a section of text be removed from a page and replaced with a link to it. This may be done to eliminate information from a page that, although of interest, interferes with the flow of the text. Block 610 represents branching on such a choice. If it is determined 618 that the section of text to be linked to is part of the document, method 600 allows for the section of text to be selected 620 and a command to create a new blank sub-page to be issued 622, e.g., by the user's right clicking on the selected text and choosing the create command from a menu of actions. A new sub-page containing the selected text is inserted 612 into the document, and the selected text in the document is replaced with a hyperlink to the sub-page. When the section of text is not part of the document, a selectable option/button and/or menu item, e.g., from the menu opened by right clicking on the document, can execute 624 a command to create a new blank sub-page. A dialog box can prompt 626 the user to enter the section of text for the hyperlink. Upon receiving a "SAVE" or "OK" indication from the user 628, the sub-page with the entered text is inserted 612 as part of the document and a hyperlink to the new sub-page is inserted 614 into the currently active page, generally at the last position of the cursor. A sub-page can also include links to other sub-pages. Method 600 ends 630 once the sub-page and link have been inserted.

For deleting or removing a sub-page, the user can select the sub-page by name from a list of sub-pages, and/or select a link to the sub-page in the document. Upon receipt of a command to delete a sub-page, the illustrated embodiment scans the document (including all sub-pages) for references to the selected sub-page to be deleted and removes hyperlinks from the document and sub-pages that point to the sub-page to be deleted. Such a scan can also be performed when a document is saved so as to remove sub-pages or layers that are no longer hyperlinked. Conversely, the user can select a link only for removal, in which case the resource to which it refers is removed if the file contains no other links to the referred-to resource.

The disclosed Web-information manager thus enables a user to edit a multilayer document that can include pages and sub-pages, where sub-pages can further include sub-pages. Sub-pages can be accessed using a selectable hyperlink, although other selectable items can be used. A list of all sub-pages, including their respective sizes, can be presented to an author/user. For example, in the document-viewing mode of FIG. 11, item list pane 72 can display the sub-pages in the document. Sub-pages can be removed from a document and hyperlinks can be automatically updated to reflect the removed sub-page.

Figure 12:
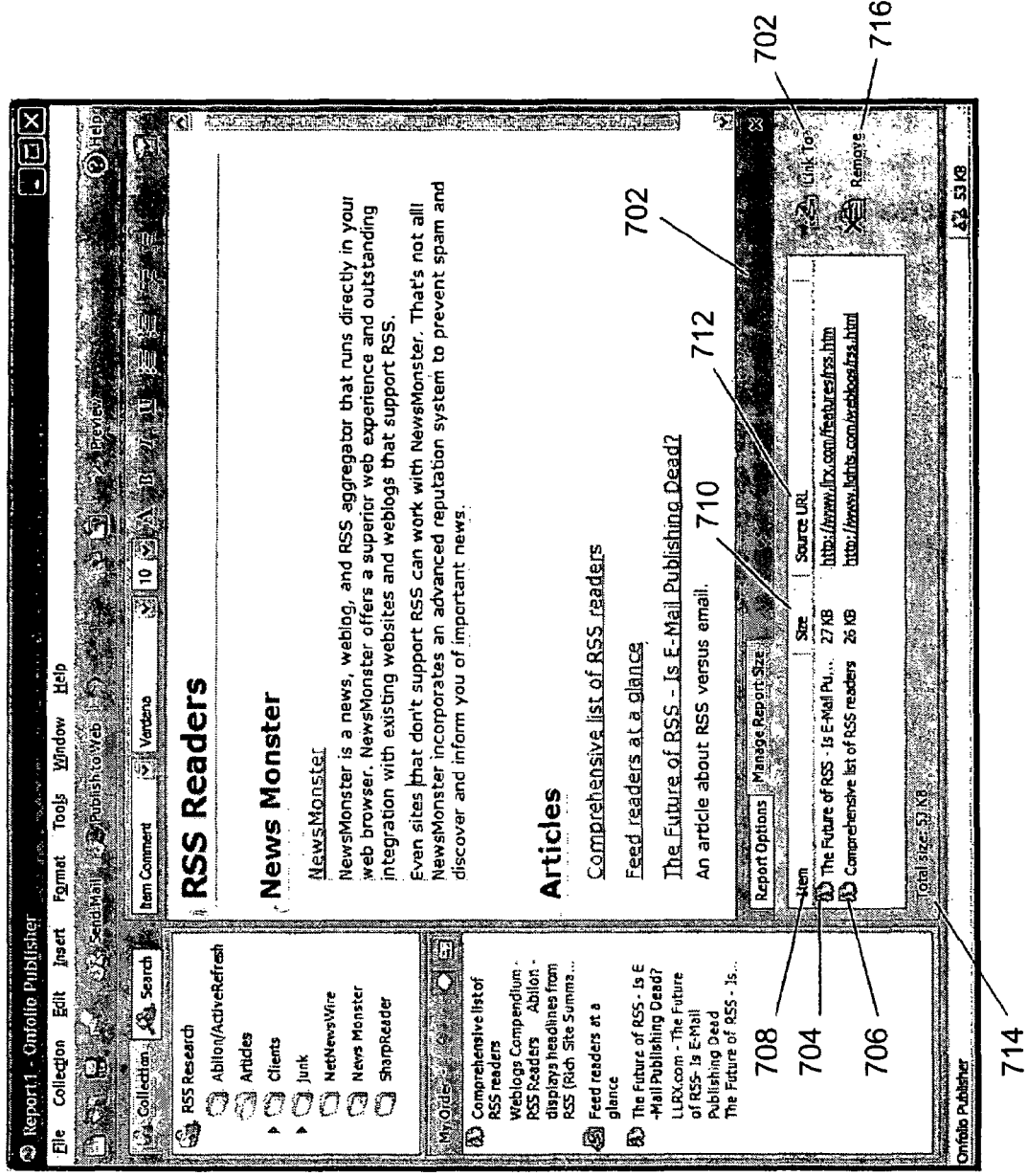
FIG. 12 is a screen shot of an activated document pane.

The illustrated embodiment includes an authoring tool that provides users with an ability to observe the total size of the document and the sizes of individual layer to determine which layers take up the most space. FIG. 12 is a screen shot that depicts a scenario in which a document pane 702 has been activated. Document pane 702 includes a listing of sub-pages in the document. For the illustrative screen shot of FIG. 12, sub-pages 704 and 706 are shown. The listing includes the sub-page's title 708, size 710, and source URL 712. For documents having large numbers of embedded sub-pages, where the sub-pages can include multiple large images, the total size of the document, shown at 714 in FIG. 12, can become quite large, requiring large storage capacities and/or making transmission difficult. While large embedded sub-pages can be removed, e.g., by using button 716, the illustrated embodiment provides for converting an embedded sub-page to a linked object that is stored at a new source location. When an embedded sub-page is selected and button 716 is activated, the document's internal structure is updated such that the link to the sub-page is converted to a link to the object to which the selected sub-page was converted. When the document is subsequently read, the linked object can be automatically downloaded or retrieved from the source location as needed.

Manual Ordering

As previously described, the illustrated Web-information manager enables a user to capture Internet resources and organize them by placing them into folders. When the contents of a folder are viewed, as in item list pane 72 of FIG. 4, the system sorts the items contained in the folder according to a pre-determined criterion, such as by date, name, or other criterion associated with the items, as is known in the art. As is also known, folders and/or their contents can be ordered by performing drag-and-drop operations to obtain a customized order. For example, a favorites list in a web browser can be so ordered, or "organized." Heretofore, though, a previous custom order has no longer been available once a new order is chosen. For example, only the latest organized favorites list can be viewed. Similarly, a customized order is no longer available once one of the pre-determined order types is chosen.

Figure 13A:
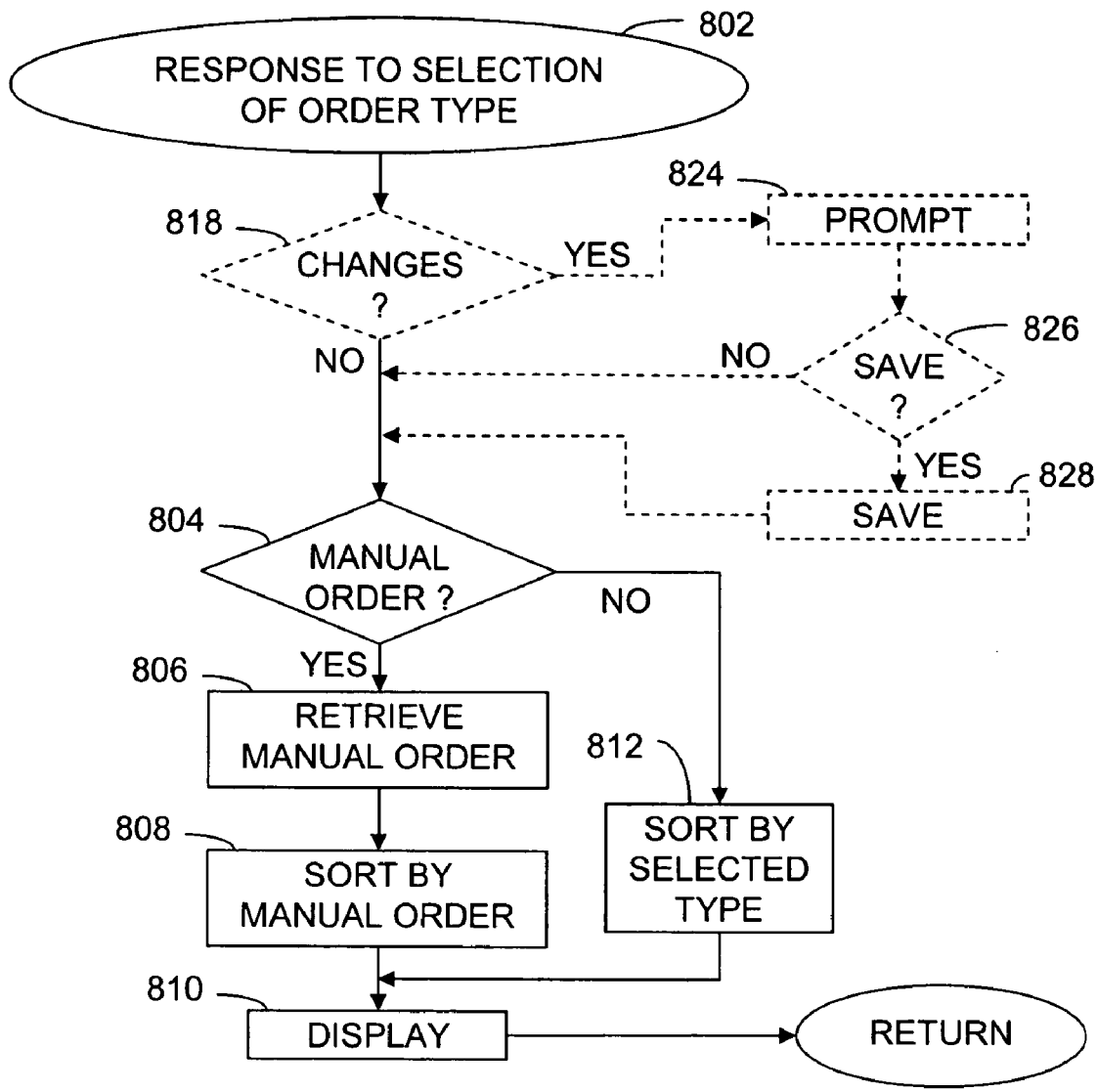
FIGS. 13A and 13B are flow charts of a method of storing a manual ordering of folder contents.
Figure 13B:
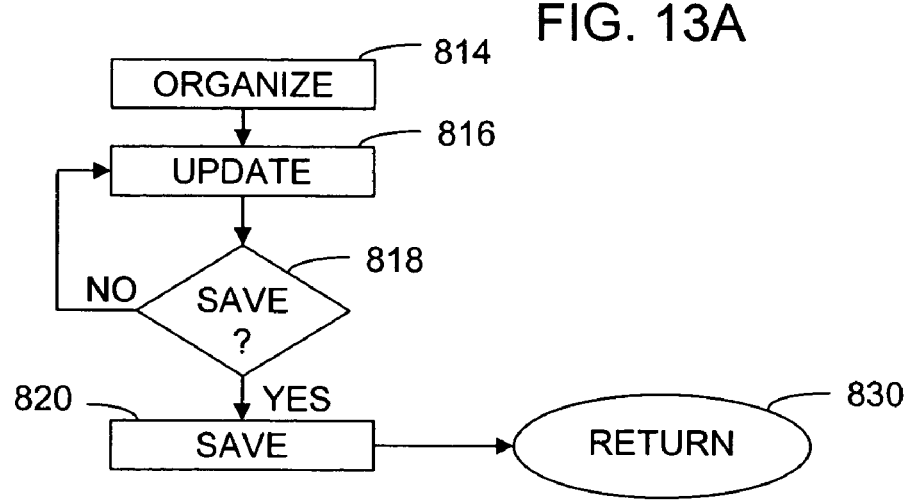

In contrast, the illustrated Web-information manager enables a user to specify a manual order and provide for storing the specified manual order for future viewing. When a user switches from the manually ordered view to another sorted view and back again, the manual order specified by the user is restored. FIGS. 13A and B are flow charts that illustrate this behavior. The method of FIG. 13A begins 802 in response to a user's selection of an order for viewing the items in a folder, e.g., the order in which the items are displayed in item list pane 72. The selection can include choosing a menu item, button, or the like. In addition, the selection can be initiated by selecting another folder for viewing its contents, in that displaying the items for the newly selected folder constitutes a new ordering of items. If the selected type is a manual order 804, the stored manual order is retrieved 806, the items are sorted 808 in accordance with the manual order and displayed 810 to the user in the sorted order. In a first instance, the manual order can be defaulted to one of the pre-determined order types. If one of the pre-determined order types is selected, i.e., the manual order is not selected, the current order is sorted 812 according to the selected pre-determined type and then displayed 810.

Using drag-and-drop and/or other known ordering operations to reorganize 814 the listing, the display is updated 816 as each such operation is performed. Spontaneously or, in some embodiments, in response to a prompt, the user can give a save command 818 in response to which the illustrated embodiment saves 820 a description of the then-current updated order as the stored manual order. In one embodiment, the save command is activated by the user's choosing an icon, button, menu item or the like. Optionally and as shown in phantom in FIG. 13A, in response to selection of an order for viewing, the system may determine 822 whether changes were made to the then-current order since the last selection and, if so, prompt 824 the user for a decision whether the changes should be saved. As blocks 826 and 828 indicate, the then-current changed order is saved as the stored manual order if the user so chooses.

Shared Collections

When more than one client is using contents of the same collection file, it is desirable for one client's in-memory representation of those contents to reflect changes that the other processes may have made in the file. As will be explained below, the illustrated embodiment provides such a feature by having file-changing clients log their changes and by having file-content-using clients repeatedly poll those logs and update their copies of the contents that have been changed. As will also be explained, the logging and polling are performed in such a manner as to enable change detection and resultant refreshing to be performed with a granularity finer than that of the collection files.

A collection file can contain many types of data from a web site, and it can therefore be quite large. But a client will often deal only with small portions of a collection file's contents. To make it convenient to identify such discrete portions, a client that is creating a collection file treats the collection file's contents as divided into "entities," which can be, for instance, images, text strings, lists, etc., and assigning them respective universally unique identifiers. The particular way in which division into entities is performed is not critical, but it is preferable that the division reasonably match the granularity with which a client will tend to use the data. A client will tend to display, store, or delete whole images, for instance, so a whole image would typically be designated a single entity.

In any event, when a client thereafter needs to use an entity, it allocates a volatile entity object in memory, reads from the common storage facility the collection file that contains the desired entity, and fills the entity object's fields with the entity's data retrieved from the collection file. Having thus read the entity data from persistent storage, the client may rely on the resultant volatile entity object data for an extended period of time. For instance, it may use it to maintain a user display of that entity's contents.

Now suppose that, while one client, Client A, is thus displaying an entity's data, another client, Client B, revises the common-storage facility data that Client A's entity object is intended to reflect. Unless some action is taken, Client A will end up displaying stale data. One approach to making updates would be for the updating client to interrupt each other client, or at least each other client that is using the revised data, and alert it to the change. But this approach is not particularly robust. The alerting mechanism may be blocked by, e.g., a firewall, or some other factor may defeat one client's alerting the other. The illustrated embodiment uses a mechanism that is more robust. Client B merely writes a log that summarizes the changes so that other clients can refer to the log from time to time in order to determine whether their volatile entity objects need to be updated.

Figure 9A:
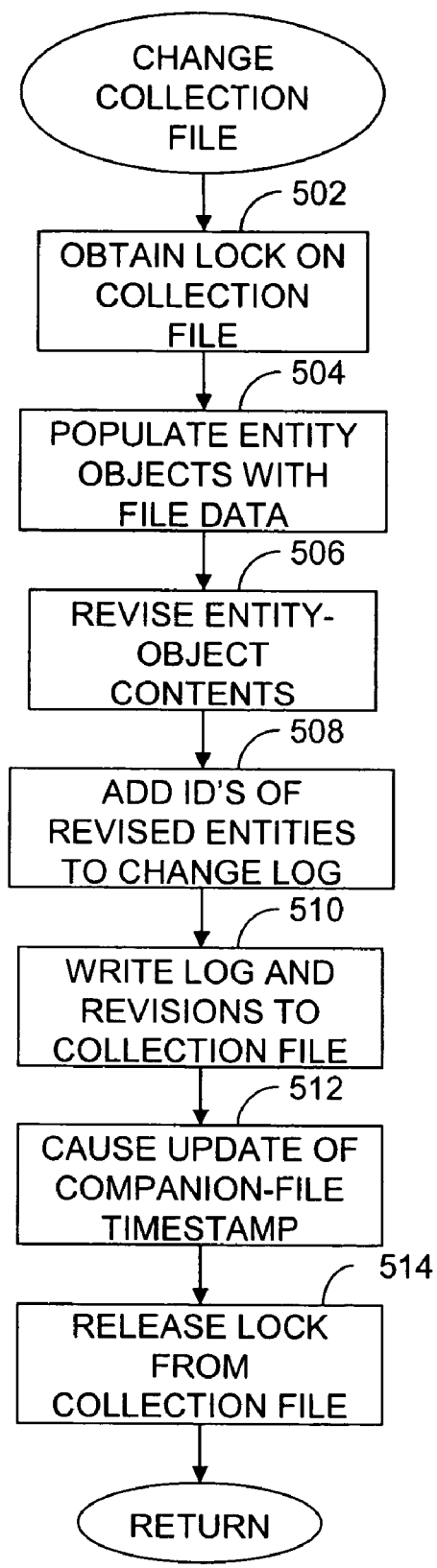
FIGS. 9A-C are flow charts that illustrate a way to propagate persistent-file changes among multiple client programs using the file's contents.

Although there are many ways of performing logging without departing from the present invention's teachings, an advantageous approach is the one that the illustrated embodiment employs, namely, that of performing the logging at two levels. In the example, when Client B is to change the collection file in which a captured collection is stored, it obtains a write lock on the collection file, as FIG. 9A's block 502 indicates. As block 504 indicates, it then reads subsets of the file's contents into memory and uses is them to populate corresponding entity objects. It makes the desired changes in those objects, as block 506 indicates, and, for each changed entity, adds a log entry that identifies the entity and indicates whether the change was an update or a detection. Block 508 represents that operation. It then writes the updated contents, including the log, back into the collection file, as block 510 indicates. The log thereby stored is a fine-granularity log: it lists changes as the entity level.

Client B additionally logs a coarser granularity. It does so by revising a companion file to reflect completion of the collection-file revision. The revision causes the companion file's operating-system-assigned "last-modified" timestamp to be updated, as block 512 indicates, and other clients can thereby detect a change simply by reading that timestamp. As block 514 indicates, Client B additionally releases the lock on the collection file. The reason why other clients would use the separate, companion file's timestamp for this purpose rather than the timestamp of the collection file itself is that, in the illustrated embodiment, Client B employs the local operating system's transaction-processing features to enforce appropriate atomicity on the file operations, and the collection file's timestamp may in some circumstances be changed before the transaction has been committed. To avoid having other clients read the collection file in an intermediate state, the file-changing client will change the companion file only when the transaction by which collection-file revision has been made has committed. The illustrated embodiment associates the companion file with the corresponding collection file by giving it a name that differs from the corresponding collection file's only in its extension: if the collection file's name is "foo.cfs," for example, the companion file may be named "foo.cf~."

As was stated above, the companion file's purpose is to enable other client processes to determine readily whether changes have been made in the corresponding collection file's contents. In principle, a client that is using a given collection file's contents need only examine from time to time the timestamps of the companion file associated with that collection file, and, if the timestamp is no later than the time at which it last read that file, there is no need to read the collection file and consult its log.

In the illustrated embodiment, there is a division of the polling labor among threads and processes to obtain efficiencies when a given machine is executing more than one client. A respective client process performs most of a given client's operations, but all clients on a given machine obtain stored collection data by employing their respective individual processes to make inter-process requests therefor to a local common "server" process that runs on the same machine. This process obtains the data, possibly by causing the local operating system to fetch the data from a local disk, but sometimes by having the request made to a remote file server. And, as will be seen, this local server process also performs part of the polling operation.

To appreciate the local server's role in that polling operation, it helps first to consider the local server's role in fetching data. The typical sequence by which an individual client obtains data from a collection file begins with the respective client process's sending to the local server process an Open message, which identifies a collection file and indicates that the client process should be apprised if changes to that file occur. Among the results of this request is that the local server places that file on a list of files whose changes it monitors, as will be explained in due course. Having thus "opened" the collection file, the individual-client process sends the server process a Load message, which identifies an entity whose data the client is requesting. The local server obtains the data and sends it to the individual-client process, which accordingly populates a volatile entity object with its contents. It also places that entity on a process-local list of entity objects that it will attempt to keep current. At some point, the individual-client process may stop using the collection file's contents, in which case it will send the local server process a Close message, which indicates that the individual-client process no longer needs to be kept apprised of that file's changes. If no other client processes on the same machine have opened that file without closing it, the local server responds by removing that collection file from its list of collection files to monitor.

Figure 9B:
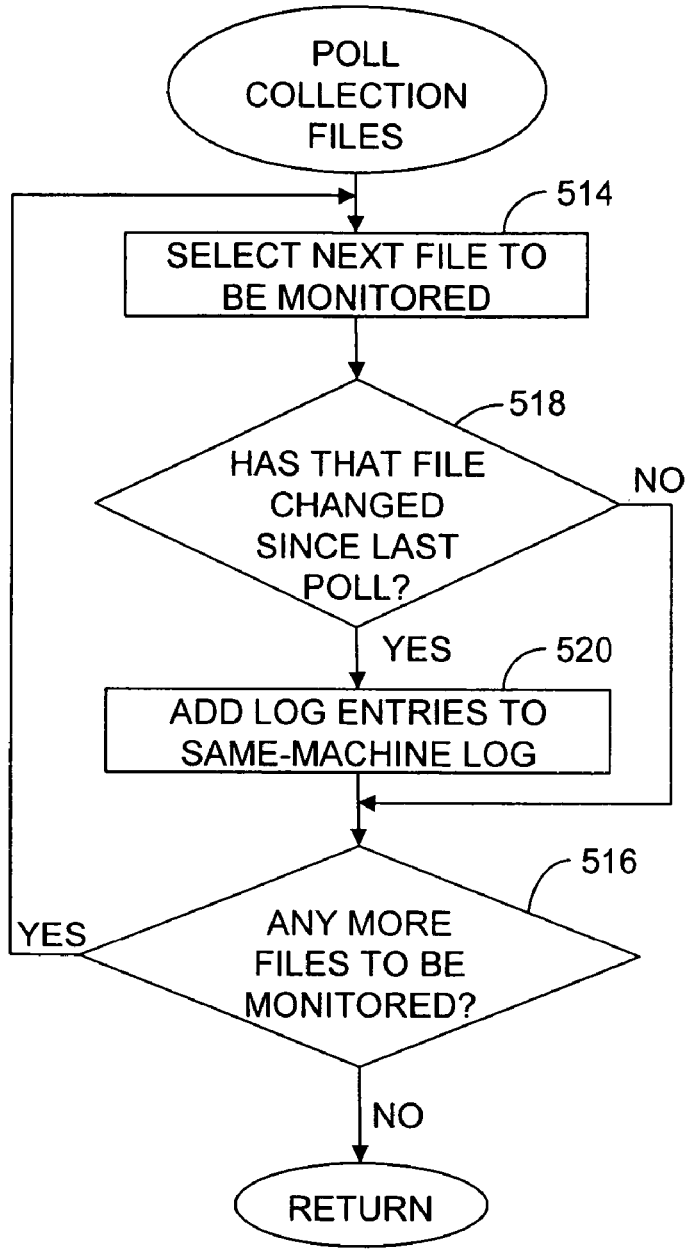

From time to time, the server process examines the timestamps of the companion files that correspond to the collection files it is monitoring, as FIG. 9B's blocks 514 and 516 indicate. If a given companion file indicates that the corresponding collection file has been updated since the server process last read it, the server process is opens that collection file, reads its finer-granularity, entity-level log, and places in a location accessible to the same-machine client processes a list of the entities that were changed since the last such poll. (The server process can identify the entries that have been made since the last poll by noting that their positions in the log are beyond that of the previous end of the log.) Blocks 518 and 520 represent that operation.

Figure 9C:
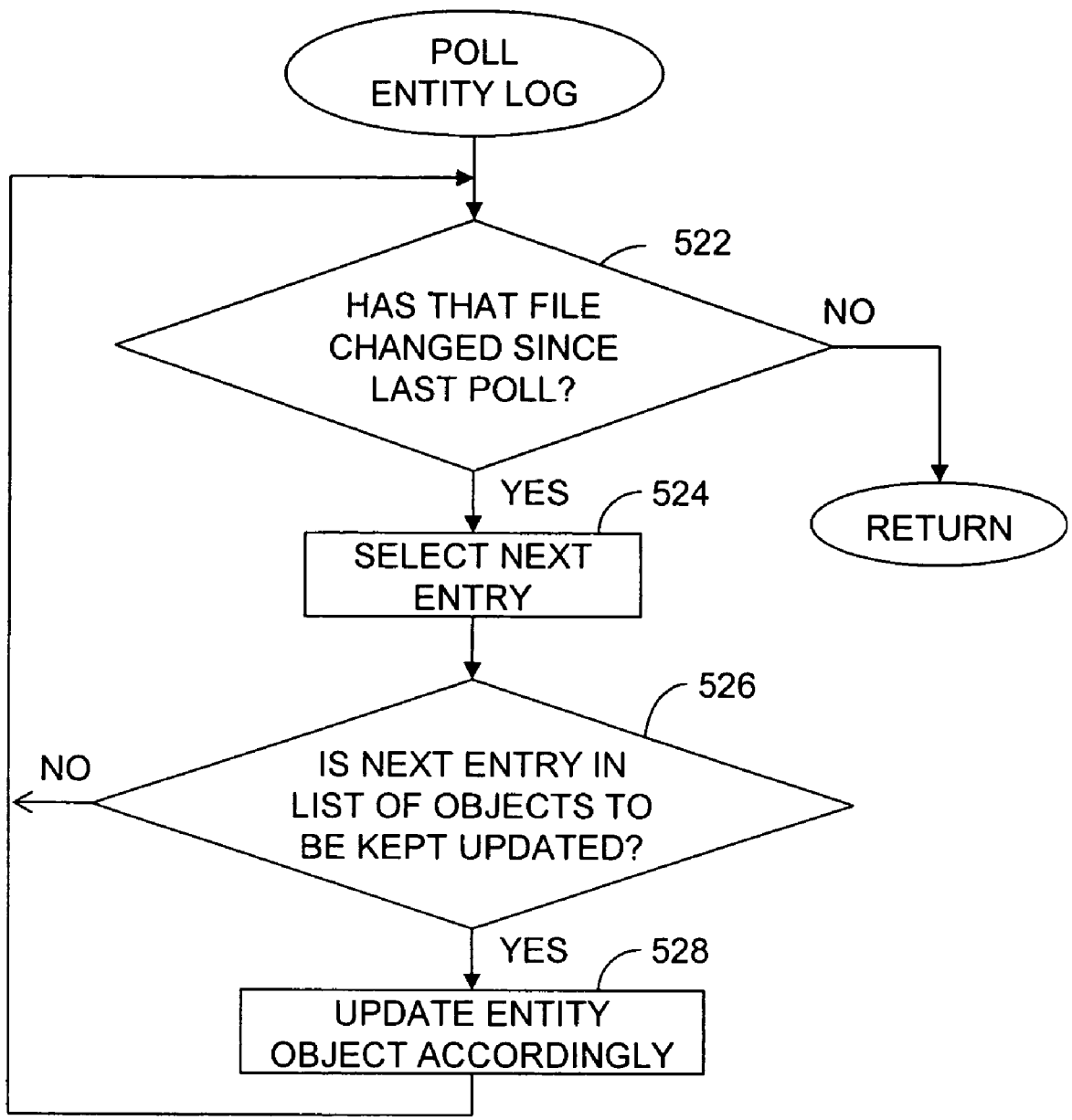

Also from time to time, each individual-client process performs entity-level polling by reading the logs thus made available since the last time it did such polling. For each entity in the log that was changed since the last time it polled, it determines whether that entity is in that process's list of entities that it needs to keep updated, and it makes any necessary changes in its corresponding volatile entity objects, as FIG. 9C's blocks 522, 524, 526, and 528 indicate. Typically, the individual-client process performs such polling in a thread separate from its main thread that is using the entity objects; from the point of view of the main thread, the objects automatically keep themselves updated. As a consequence, displays and other features that a client bases on collection-file contents get updated to reflect changes that other clients have made in those files.

Unread-State Management

As described previously herein, many people receive syndicated news or other web content by subscribing to RSS feeds. A user agent monitors one or more web sites and notifies a subscriber when an article or web page related to user specified content is available. FIG. 14A is a flow chart of a method that the illustrated Web-information manager uses to manage such a feed service.

The method begins 902 when a user agent monitoring a feed finds a new item or items having content of interest to the user. The agent generates 904 a capture command that causes the system to download and store 906 the newly found items into a folder that the user has designated for the feed. The capture and store is performed generally as described with respect to FIGS. 2-4, but without user interaction. The capture and store for the described embodiment is performed automatically in a background mode. The user can specify more than one feed, and each of the feeds can have its individual folder, or the user can associate different feeds with one another by placing them in the same folder. As previously described, folder contents or items may have associated comments, flag settings, and/or other indicators. An unread-state indication is associated 908 with each captured item from a feed when the item is first captured, and the method then ends 909.

FIG. 14B is a flow chart of a method for displaying items from a feed. The method begins in response 910 to the user's selecting to read the unread items in a folder. It then generates 912 a "newspaper view," which, as will be illustrated below, displays 914 items having the unread-state indication, including inline content and embedded resources for the items, and the method ends 915.

FIG. 14C is a flow chart of a method for tracking which item in the newspaper view is being read. As a user navigates 916 through the items in the newspaper view by, e.g., clicking on an item or using standard scroll bars and up/down arrows, the Web-information manager monitors the user's input to determine which items the user is reading. Specifically, if the user clicks on an item in the newspaper display, or the cursor remains at one position in an item for a predetermined duration, the Web-information manager treats the item as being read, and it highlights that item 918 or distinguishes it from other items in some other way, such as by bolding the item and/or placing a border around it, as an indication to the user that system has concluded that the item is being read.

In further response to the user's thus navigating to an item, the unread-state indication is removed 920. The method continues 922 to await further page captures, selection of the newspaper view, and/or selection of an unread item.

Figure 15:
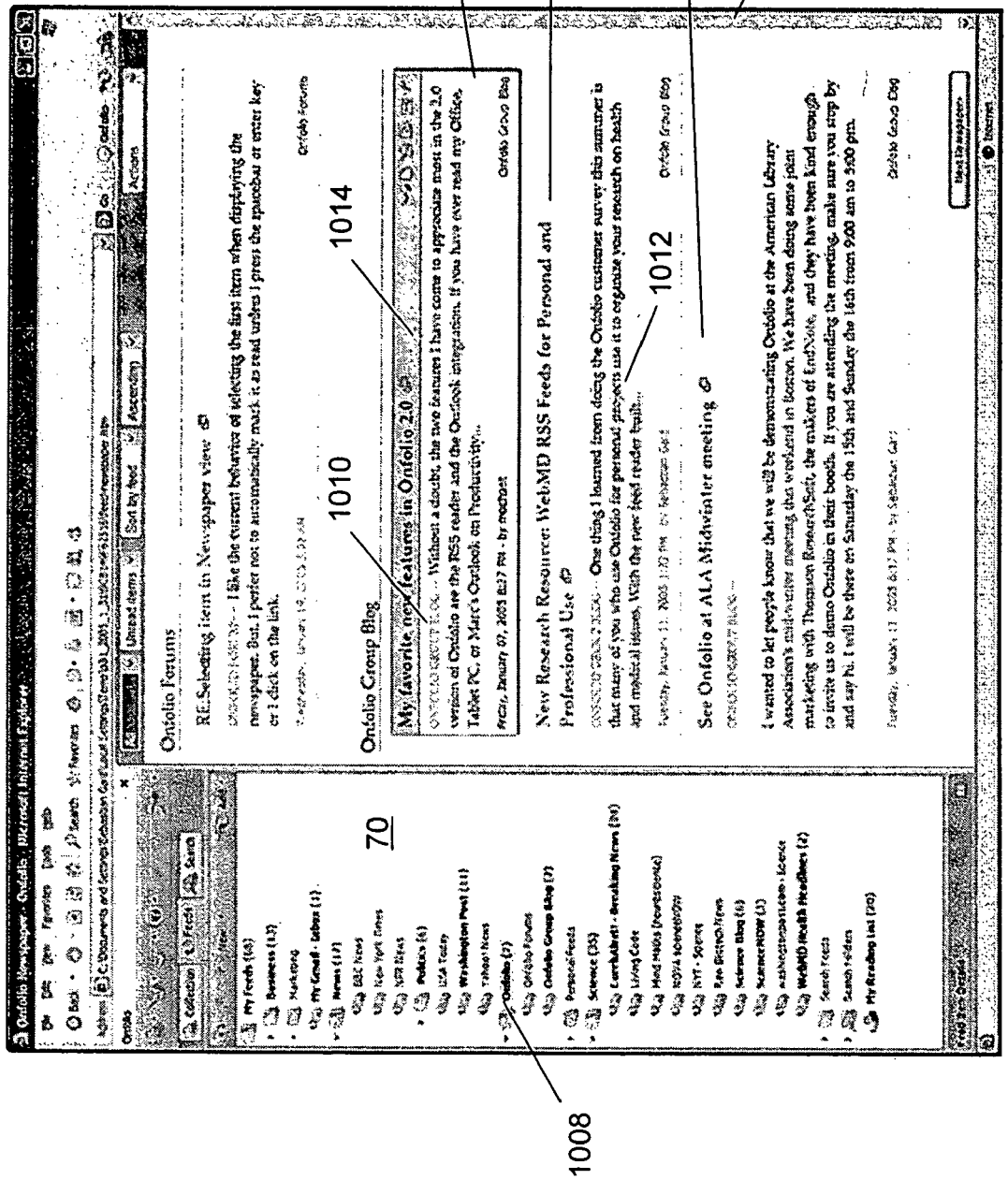
FIG. 15 is a screen shot of a "newspaper" view of unread items.

FIG. 15 is a screen shot 1000 that illustrates a newspaper view of unread items 1002, 1004, and 1006 displayed in window 58. In folder pane 70, the Onfolio folder 1008 is highlighted to identify the folder where the displayed items are located. Since the newspaper view displays all unread items in a folder, an item-list pane, such as pane 72 of FIG. 4, need not be shown. By default, the items are ordered by date, with more-recent items appearing before less-recent items, although other order selections can be made; items can be ordered by, e.g., subject, feed source, etc. Each item includes a link to the feed page, e.g., link 1010 of item 1002, and includes the contents for that item, including inline content, embedded resources, and other content, such as text portion 1012 of item 1004, that were downloaded from the feed. For the screen shot of FIG. 15, the user has navigated to item 1002, so item 1002 is highlighted and toolbar 1014 is displayed with that item. Through the toolbar 1014, the user can choose to take actions such as emailing or copying the item, adding comments, setting a flag, etc. For the screen shot of FIG. 15, toolbar 1014 also serves to distinguish item 1002 as the item currently being read.

As described with relation to FIG. 14, once an item is selected, the unread-state indication is removed. The item continues to be displayed in the newspaper view until a new view is chosen or the user chooses to remove read items from the view. Remaining displayed items that have been read are typically de-emphasized, e.g., by graying or ghosting, to distinguish them from unread items, although other way of doing so, such as highlighting, bolding, bordering, etc., may be used instead or additionally. Optionally, read items can be automatically removed from the view once the user moves to another item in the view. Also optionally, toolbar 1014 can include a provision that enables a user to set a flag that marks a read item for further reference. Items so marked are distinguishably displayed with unread items in the "newspaper" view. When an item so marked is selected, the user can use toolbar 1014 to unset the flag.

The embodiment described above provides advantages over conventional presentations. For example, while conventional "preview panes" sometimes found in email applications display the full content of an item to the user, such a preview pane is limited to a single item, so a separate pane is needed to list the items, and the user needs to select the item in the separate pane to get the preview plane to display it. In conventional "auto preview" modes, all items from a selected folder are shown, but only a limited amount of text with limited formatting is displayed for each item, and embedded images are not displayed. For conventional displays of feed web pages, the full content is displayed for all items, but the system does not identify the article being read by monitoring actions taken on the display, so it cannot thereby keep track of which articles have been read. In contrast, the newspaper view of the embodiment described above has a single pane where all items are displayed, including embedded resources. The user simply scrolls or navigates through the items to view the items. As the user navigates to an item, the item is highlighted or otherwise distinguished to provide an indication of which item the system is treating as being viewed.

Elements, components, modules, and/or parts thereof that are described and/or otherwise portrayed through the figures to communicate with, be associated with, and/or be based on, something else, can be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, can be made by those skilled in the art.

What is claimed is:

1. A computer-implemented method for organizing results of browser-based research, comprising:
    employing a processor to execute the following computer executable acts stored on a computer readable medium:
    logging hyperlinks associated with user navigation of a chain of Web pages, the chain of Web pages comprising a root Web page and a plurality of subsequent Web pages, wherein each of the subsequent Web pages is linked to a previous Web page by a hyperlink in the previous Web page;
    creating a list of the logged hyperlinks representative of the chain of Web pages;
    determining that the root Web page was produced by a search-engine, which produced the root Web page in response to a search specification submitted by the user to the search-engine, wherein said determination is made by inspecting a Uniform Resource Locator ("URL") associated with the root Web page;
    storing a search specification object upon making said determination, wherein the search specification object includes the URL associated with the root Web page, the search specification, and an identity of the search-engine;
    identifying copyright information within the root Web page and associating the copyright information with the search specification;
    displaying a current Web page, wherein the current Web page comprises a Web page in the chain of Web pages to which the user navigated through selection of a hyperlink in a previous one of the chain of Web pages;
    receiving a user request to display the search specification associated with the current Web page; and
    displaying the search specification in response to receiving said user request.

2. The method of claim 1, wherein the search specification is inferred from the URL associated with the root Web page.

3. The method of claim 1, further comprising determining the identity of the search-engine wherein said determining the identity comprises inspecting the URL associated with the root Web page.

4. One or more computer-storage media storing computer-usable components for organizing results of browser-based research, the computer-usable components comprising:
    an interface that is integrated with an Internet browser, wherein the interface provides an interface window having a collection-explorer pane that includes identifiers corresponding to captured content, wherein the interface window is distinct from the Internet browser;
    a search component that searches for a Web page within a hyperlink chain and determines a search-result page within the hyperlink chain;
    a specification component that associates a search-result Uniform Resource Locator ("URL") and a search specification with the Web page based at least upon the search-result page;
    a tagging component that identifies metadata related to the Web page and associates the metadata with the search specification, the metadata including copyright information related to the Web page; and
    a navigation log that creates a list of entries of hyperlinks in the hyperlink chain.

5. The media of claim 4, wherein the search component determines the search-result page based at least in part upon the URL from one of the Web pages within the hyperlink chain.

6. The media of claim 4, wherein the computer-usable components further comprise:
    a monitoring component that inspects the URL from a visited Web page for the search specification.

7. The media of claim 4, wherein the search component determines a search-engine identity based at least in part upon the URL from one of the Web pages within the hyperlink chain.

8. The media of claim 4, wherein the tagging component associates the copyright information based at least in part on capturing the Web page.

9. The media of claim 4, wherein the search component imports at least one link from the search-result page not originating from the hyperlink chain.

10. The media of claim 4, wherein the specification component stores at least a portion of the Web page including at least one of a string of text, a file, a link to a file, an image, a copy of the Web page, a link to the Web page, an object, a resource, or any combination thereof.

11. The media of claim 4, wherein the tagging component further associates at least one of the URL, search specification, or any combination thereof with at least a portion of the Web page.

12. The media of claim 4, wherein the specification component returns a null output in response to the search-result page not containing a valid root page.

13. The media of claim 4, wherein the computer-usable components further comprise a storage component that stores at least one reference other than the Web page from the search-result page.

14. The media of claim 4, wherein the computer-usable components further comprise a notification component that notifies a user of availability of new content by searching based at least in part on the search specification.

15. A computer-implemented method for organizing results of browser-based research, comprising:
    employing a processor to execute the following computer executable acts:
    displaying an interface window associated with an interface that is integrated with an Internet browser, the interface providing an interface window having a collection-explorer pane that includes identifiers corresponding to captured content, wherein the interface window is distinct from the Internet browser;
    logging hyperlinks associated with user navigation of a chain of Web pages, the chain of Web pages comprising a root Web page and a plurality of subsequent Web pages, wherein each of the subsequent Web pages is linked to a previous Web page by a hyperlink in the previous Web page;
    creating a list of the logged hyperlinks representative of the chain of web pages;
    responding to a search for a Web page within the hyperlink chain by determining a search-result page within the hyperlink chain;
    associating a search-result Uniform Resource Locator (URL), a search specification, and a search-engine identity with the Web page based at least in part upon the search-result page;
    identifying copyright information within the Web page and associating the copyright information with the search specification;
    selecting a sub-page by name from a list of sub-pages;
    receiving a user request to capture content related to the document;
    providing a dialog box in response to receiving the user request to capture content related to the document, wherein the dialog box comprises a selection button that enables the user to choose whether the system will download and save a local copy of the content or will provide a link to the content;
    capturing the content related to the document;
    selecting a section of the content based upon user input; and
    replacing the section of selected content with a link, the link accesses a sub-page that displays the selected content upon activation of the link.

* * * * *

UNITED STATES PATENT AND TRADEMARK OFFICE
CERTIFICATE OF CORRECTION

PATENT NO. : 7,702,678 B2  
APPLICATION NO. : 11/079446  
DATED : April 20, 2010  
INVENTOR(S) : Charles J. Teague Page 1 of 1

It is certified that error appears in the above-identified patent and that said Letters Patent is hereby corrected as shown below:

In column 14, line 1, in Claim 1, after "Web page," delete "a".

In column 16, line 2, in Claim 15, delete "web" and insert -- Web --, therefor.

Signed and Sealed this
Eighth Day of February, 2011

David J. Kappos
*Director of the United States Patent and Trademark Office*